United States Patent [19]

Junge et al.

[11] Patent Number: 4,896,492
[45] Date of Patent: Jan. 30, 1990

[54] ROW UNIT SUPPORT MECHANISM FOR TRANSVERSE MOVEMENT

[75] Inventors: Steven A. Junge, Johnston; Timothy A. Deutsch, Newton, both of Iowa

[73] Assignee: Deere & Company, Moline, Ill.

[21] Appl. No.: 248,505

[22] Filed: Sep. 23, 1988

[51] Int. Cl.[4] ............................................. A01D 46/08
[52] U.S. Cl. ........................................ 56/28; 56/15.5; 56/13.5
[58] Field of Search ................... 56/13.5, 15.5, 28, 40, 56/41, 44; 172/673, 667, 649, 645, 695; 111/69, 52, 85; 104/107

[56] References Cited

U.S. PATENT DOCUMENTS

| 293,451 | 2/1984 | Grosscup | 104/107 |
|---|---|---|---|
| 2,672,001 | 3/1954 | Bopf et al. | 56/14 |
| 3,785,130 | 1/1974 | Gaeddert | 56/15.5 |
| 3,945,177 | 3/1976 | Scott et al. | 56/13.5 |
| 4,249,365 | 2/1981 | Hubbard et al. | 56/13.3 |
| 4,470,244 | 9/1984 | Leigers | 56/15.5 |
| 4,722,173 | 2/1988 | Covington et al. | 56/15.6 |
| 4,803,830 | 2/1989 | Junge et al. | 56/28 |

Primary Examiner—Jerome W. Massie
Assistant Examiner—Matthew Smith

[57] ABSTRACT

Improved support structure for suspending transversely adjustable row units of a cotton harvester or other implement from a unit support frame. A pair of V-shaped rollers, carried by a track on opposite transverse sides of the center of gravity of the row unit, prevent fore-and-aft movement of the unit with respect to the support frame and prevent contact between the unit and the track to reduce the effort required to laterally move the units. The shaft supporting one of the rollers includes wrench flats for receiving a wrench to provide mechanical advantage for easy rolling of the units, even in the uphill direction if the machine is parked on an unlevel area. The track support includes an apertured portion which receives a tapered, spring-biased pin which automatically aligns with the holes to firmly lock the row unit in position and to prevent the unit from accidentally rolling too far if the track happens to be inclined downwardly in the direction of desired movement.

17 Claims, 2 Drawing Sheets

ROW UNIT SUPPORT MECHANISM FOR TRANSVERSE MOVEMENT

BACKGROUND OF THE INVENTION

The invention relates generally to agricultural equipment having transversely adjustable row units, and more specifically, to unit support structure for such equipment which permits the individual units to be moved to accommodate different unit spacings and to facilitate access for maintenance and repair.

In co-pending application Ser. No. 87,073 filed 19 Aug. 1987 U.S. Pat. No. 4,803,830, entitled SUPPORT ARRANGEMENT FOR A COTTON HARVESTER ROW UNIT and of common ownership with the present application, a support arrangement for individual row units is disclosed which includes rollers supporting row units on rails to permit the units to be adjusted transversely for different row widths or for facilitating inspection and maintenance of a unit. That structure utilized flat rollers which turned on a fixed shaft and rolled on a flat surface. To prevent the row unit from moving in the fore-and-aft direction, the structure supporting the roller was designed to allow limited movement before interfering with the track. When such row units were moved manually, the unit roller supports would rub against the track and cause the units to be more difficult to move. The mounting arrangement also permitted limited fore-and-aft movement which resulted in track wear and allowed the unit to move out of square with respect to the track. With the previous structure, there was also no way to conveniently provide a mechanical advantage to assist in the manual effort it took to move the row units particularly when the harvester was not level and the units had to be rolled uphill.

Another disadvantage of the structure described in the previously filed application resulted from use of removable pins at the front and rear of the row unit to locate the unit in the proper position. When a unit was moved out of normal position and the machine was not level, the previous design permitted the unit to roll downhill beyond the desired position. Also, the rear pin was difficult to reach because of the small amount of space available when the row units were spaced for narrow row cotton harvesting.

It is therefore an object of the present invention to provide an improved unit support mechanism for an agricultural implement. It is a further object to provide such a mechanism which improves the adjustability of the units and increases the positional stability of the units over previously available unit support mechanisms. It is another object to provide such a structure which reduces the effort necessary to move the row units. It is still another object to provide such a mechanism with improved securing structure for preventing the units from rolling downhill and for holding each unit firmly in the adjusted position.

It is a further object of the present invention to provide an improved unit support mechanism for a transversely adjustable unit on an agricultural implement having a track and roller designed for easier positioning of the unit and for increased fore-and-aft stability of the unit. It is a further object to provide such a track and roller design having means for providing a mechanical advantage to help the operator roll the unit, even along an uphill slope. It is a further object to provide such a track and roller design which reduces rubbing contact between the unit and the track.

It is yet another object of the present invention to provide improved locking pin structure for an adjustable unit support mechanism to solidly lock the unit in position, to reduce clearance that would result in unwanted movement, to aid in pin alignment and to prevent accidental rolling of the unit. It is yet another object to provide such a pin structure which is more easily accessible than at least most previously available structures. It is still another object of the invention to provide such a pin structure in combination with track and roller structure to hold a unit squarely and solidly in the proper position.

It is yet a further object of the present invention to provide an improved track and roller arrangement for a unit support mechanism on an agricultural implement which is relatively economical to manufacture and yet which provides easy unit adjustability and holds the unit squarely and solidly in proper position and eliminates track wear.

A unit support mechanism constructed in accordance with the teachings of the present invention includes a V-shaped roller which is fixed to a rotating shaft on the row unit and is supported on a round track. Wrench flats are incorporated into the end of the shaft opposite the roller. A spring-loaded tapered pin is used to lock the unit in place on the track.

The V-shaped roller on the round track prevents fore-and-aft movement of the unit and allows the roller support structure to be spaced away from the track. Contact between the unit and the track occurs only between the rollers and the track to reduce the effort required to laterally move the units. Two of the V-shaped rollers are supported on opposite sides of the unit to hold the unit squarely on the track. The roller shaft may be turned with a wrench to propel the unit transversely and reduce the effort required to move a unit. Utilizing the wrench an operator can easily roll a unit even along an upward incline in the event that the machine is parked on an unlevel area.

The tapered, spring-loaded pin easily aligns with and wedges into a preselected hole in the track and solidly locks the unit in position, thereby significantly reducing the movement which occurred previously due to clearance between a straight pin and the hole. The spring-loaded pin is captured within an upright support beam to prevent loss of the pin and automatically enters the preselected hole to prevent the unit from accidentally rolling too far. A series of holes along the track only allows a maximum of a preselected distance of unit movement unless the pin is manually held out against the spring bias. No pins are necessary at the rear of the unit since the combination of the V-shaped rollers and tapered pin at the front hold the unit squarely and solidly in the proper position These and other objects, features and advantages of the present invention will become apparent to those skilled in the art from the description which follows and from the drawings.

DESCRIPTION OF THE PREFERRED EMBODIMENT

Figure 1:
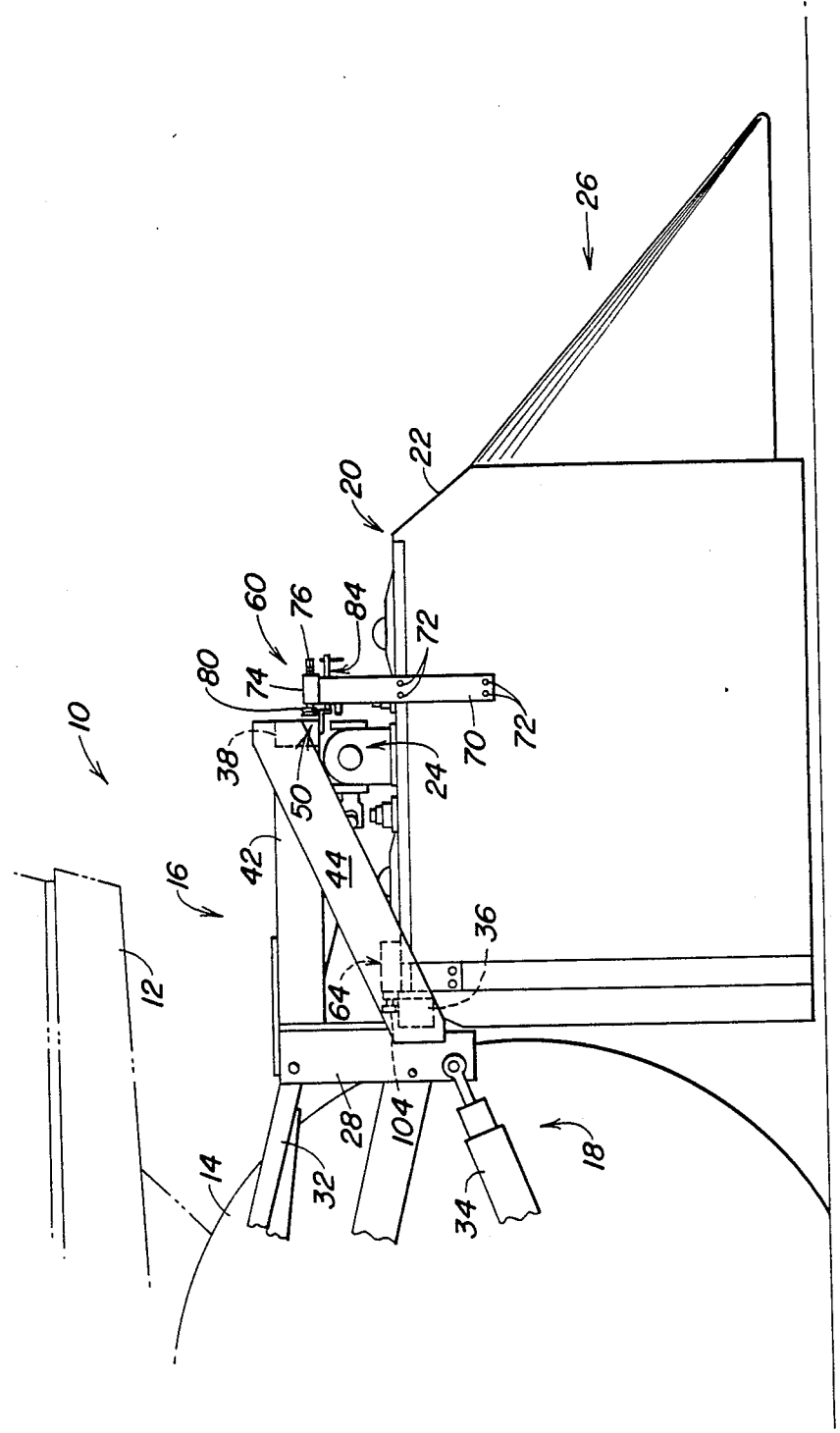
FIG. 1 is a side view of the forward end of a cotton harvester with the unit support mechanism of the present invention attached thereto.

Referring to FIG. 1, there is shown the forward portion of a cotton harvester 10 having a main frame 12 supported for forward movement over the ground by forward drive wheels 14. A transversely extending row unit support frame 16 is supported from the forward end of the main frame 12 by lift structure indicated generally at 18. The support frame and lift structure are generally of the type shown and described in the aforementioned U.S. application Ser. No. 087,073 and supports a plurality of transversely adjustable row units 20. The row units 20 are preferably of a compact design and include harvesting structure (not shown) for removing cotton from rows of plants spaced as narrowly as thirty inches. Each row unit 20 includes a housing 22 having a top portion supporting drive structure indicated generally at 24 for operating conventional drum and doffer structure located in the housing. The housing 22 defines a fore-and-aft extending row receiving area 26 which guides the row of cotton plants to the harvesting structure.

Figure 2:
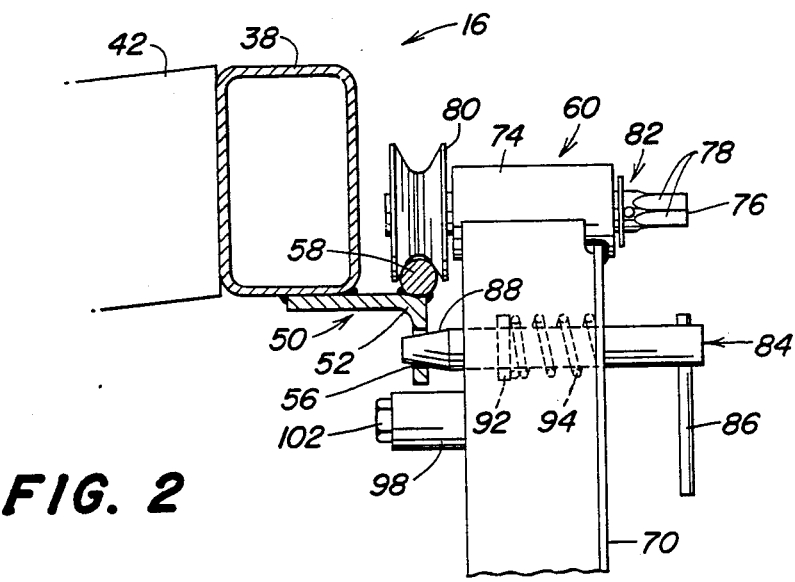
FIG. 2 is an enlarged side view partially in section showing the upper portion of the hanger and roller assembly of the unit support mechanism of FIG. 1.
Figure 3:
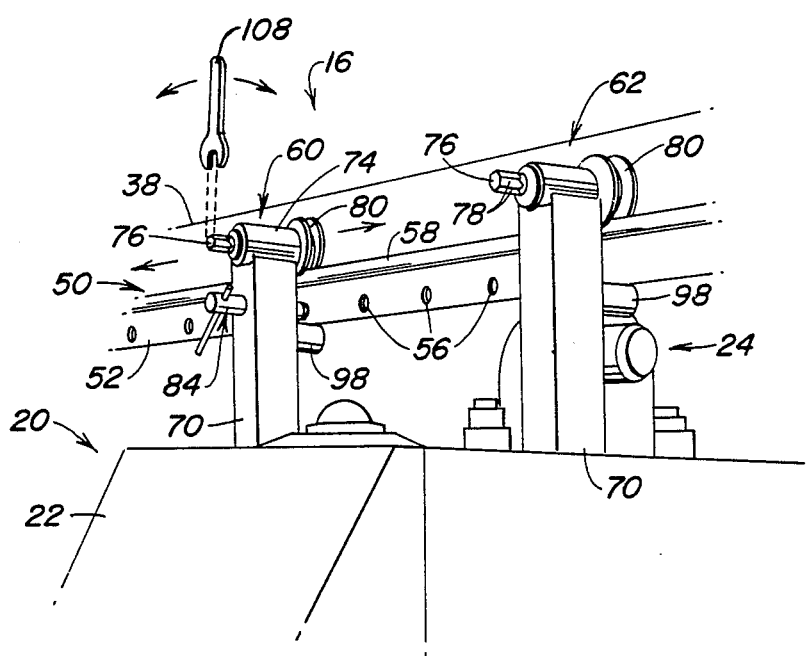
FIG. 3 is a front perspective view of the upper portion of the row unit and the unit support mechanism of FIG. 1.

The lift structure 18 includes a forward bracket 28 supported in an upright fashion by an upper and lower link arrangement 32 and movable vertically by a lift cylinder 34. The unit support frame 16 includes a lower, rear transversely extending beam 36 connected to the bottom portion of the bracket 28. An upper, forward beam 38 is supported in generally parallel relationship with respect to the beam 36 by a fore-and-aft extending upper support member 42 connected at its rearward end to the upper end of the bracket 28 and at its forward end to the aft face of the beam 38. The outer end of the beam 38 is connected to the upper forward end of an outer support 44 connected to the outer end of the beam 36 and extending upwardly and forwardly therefrom to the outer end of the beam 38. Rail structure indicated generally at 50 is connected to and extends generally the length of the forward beam 38. The structure 50 includes an angle 52 having a horizontal flange welded to the lower face of the beam 38 (FIG. 2) and a vertical flange having a series of aligned, transversely spaced apertures 56. A rail member 58 is connected to and extends upwardly from the forward portion of the horizontal flange on the angle 52. As shown in FIGS. 2 and 3, the rail member 58 is a solid bar having a circular cross section and is welded to the forward portion of the angle 52 so that the forwardmost portion of the bar extends slightly ahead of the front of the vertical flange of the angle 52. The rail member 58 defines a generally straight support member extending substantially the width of the unit support frame 16.

Each row unit 20 is suspended near the center of gravity of the unit by hanger and roller assemblies 60 and 62. A rear roller assembly 64 (FIG. 1) connected to the aft end of the row unit 20 and supported on the upper surface of the beam 36 stabilizes for the unit. The hanger and roller assemblies 60 and 62 are generally of identical construction, and therefore only the assembly 60 will be described in detail.

The assembly 60 includes an upright tubular beam 70 having a lower portion connected by bolts 72 (FIG. 1) to the side of the row unit housing 22. The beam 70 extends vertically to an upper end located above the top of the housing 22 and generally above the drive 24. A fore-and-aft extending bushing 74 is welded to the top of beam 70 and rotatably supports a fore-and-aft extending shaft 76 which has wrench flats 78 located on the forward end. A roller 80 is fixed to the aft end of the shaft 76 and is carried on the rail member 58. The roller 80 is preferably grooved or V-shaped to generally conform to the rail member 58 for rotation therealong as the row unit 20 is moved transversely with respect to the unit support frame 16. A pin and washer assembly 82 is connected to the shaft 76 between the wrench flats 78 and the bushing 74 to prevent fore-and-aft movement of the shaft in the bushing.

A spring-loaded pin 84 extends in the fore-and-aft direction through the faces of the beam 70 and is aligned vertically with the row of apertures 56 in the angle 52. The pin includes a forward operator handle 86 adjacent the wrench flats 78 and a rear tapered end 88. The tapered end 88 has an aft portion substantially smaller than the apertures 56 and a forward portion larger than the apertures 56. A washer 92 is secured to the central portion of the pin 84 within the beam 70, and a coil spring 94 encircles the pin and is compressed between the forward wall of the beam 70 and the washer 92 to urge the pin 84 in the rearward direction against the angle 52 and into a preselected aperture 56 when that aperture aligns with the tapered end 88. The tapered end 88 facilitates easy entry of the pin into the aperture 56 and provides a secure fit between the assembly 60 and the unit support frame 16. In addition, once the operator releases pin 84, the pin will enter the aperture 56 automatically to prevent the row unit 20 from rolling too far, even when the harvester is sitting on uneven ground. As can be appreciated from FIG. 2, the pin 84 is captured within the beam 70 so that there are no loose parts that can be misplaced or lost.

A horizontal bushing or spacer 98 is connected by a bolt 102 to the rear wall of the beam 70 just below the lower edge of the vertical flange of the angle 52. The bushing 98 will contact the flange and will prevent the grooved portion of the roller from coming off of the rail member 58 if for any reason the corresponding roller 80 moves upwardly with respect to the unit support frame 16. The tapered pin 84 normally secures the corresponding hanger and roller assembly against movement in the vertical as well as the transverse direction.

The assemblies 60 and 62 are secured on opposite sides of and slightly forwardly of the center of gravity of the row unit 20 so that the rollers 80 are located generally above but ahead of the center of gravity. This arrangement provides a stable support assembly and permits the row unit 20 to be easily moved transversely on the rail member 58. The arrangement also provides a slight tendency for the rear of the row unit to tilt downwardly. The rear roller assembly 64 (FIG. 1) includes an aft roller 104 which rests on the top of the beam 36 to stabilize the row unit 20.

A wrench such as shown at 108 in FIG. 3 may be placed over the flats 78 on the shaft 76 to provide a mechanical advantage for the operator to easily move the row unit 20 along the unit support frame 16 by rotating the shaft 76 and thereby driving the roller 80 on the rail member 58. Therefore, the operator can easily move the row unit in the desired direction, even if the harvester 10 is on uneven ground and the desired direction of movement is uphill.

In operation, assuming that the operator wishes to move the row unit 20 transversely to change row spacings or to open up the row units for maintenance or inspection, he simply grasps the handle 86 and pulls the pin 84 against the bias out of the aperture 56. Thereafter, he rolls the unit in the desired direction on the rail member 58. If for any reason the row unit 20 should not roll easily along the rail member 58, the operator simply inserts the wrench 108 over the flats 78 in the shaft 76 and turns the shaft to drive the roller 80 and propel the row unit in the desired direction. Once the pin 84 has cleared the original aperture 56, the operator can release the handle 86 and let the tapered end 88 ride against the upright flange of the angle 52 until the pin 84 aligns with the next aperture 56 whereupon the spring 94 will bias the end 88 into the aperture and wedge the pin therein to firmly secure the row unit against transverse movement with respect to the unit support frame 16. Once the pin 84 is released, movement of the row unit beyond the position wherein the pin aligns with the next aperture 56 is prevented since the tapered end will automatically project into that aperture.

The V-shaped rollers 80 transversely spaced on the round fore-and-aft track 58 prevent fore-and-aft movement of each row unit 20 and allow the roller assemblies 60 and 62 to be spaced away from the track to eliminate friction between the row unit and the track. The transverse spacing of the V-shaped rollers 80 holds the row unit 20 squarely on the track 58.

Having described the preferred embodiment, it will be apparent that modifications can be made without departing from the scope of the invention as defined in the accompanying claims.

We claim:

1. Unit support structure for mounting a row unit for transverse movement on the forward end of an agricultural harvester, comprising:

a transversely extending row unit support frame including a horizontal rail having an upwardly projecting portion;

hanger structure connected to and projecting upwardly from the row unit; and first and second transversely spaced rollers connected to the hanger structure for rotation about fore-and-aft extending axes and supported on the upwardly projecting portion of the rail for transverse movement thereon, said rollers including groove means receiving the upwardly projecting portion therein for preventing fore-and-aft movement of the row unit relative to the support frame and holding the unit squarely on the rail.

2. The invention as set forth in claim 1 wherein the unit support frame includes a transversely extending apertured member; and pin means connected to the row unit for selective alignment with the apertures of the transversely extending member as the row unit is rolled transversely on the horizontal rail, and means for automatically biasing the pin means into a selected aperture when aligned therewith to prevent the row unit from moving transversely beyond a given location relative to the support frame.

3. The invention as set forth in claim 2 wherein the pin means includes a tapered end which wedges into the selected aperture.

4. The invention as set forth in claim 1 wherein the hanger structure comprises first and second upright beams projecting upwardly above the row unit on transversely opposite sides of the center of gravity of the row unit, and wherein the first and second rollers are connected to the upper ends of the first and second beams, respectively.

5. The invention as set forth in claim 1 including a shaft drivingly connected to one of the rollers, and means for turning the shaft to rotate said one of the rollers to move the row unit transversely.

6. The invention as set forth in claim 1 wherein the horizontal rail comprises an angle and a rod-like member of circular cross section fixed to the angle 7. The invention as set forth in claim 6 wherein the angle includes a horizontal flange and the rod-like member projects upwardly from the flange to define the upwardly projecting portion, said angle also including an upright flange, and means for securing the hanger structure to the upright flange for locking the row unit in a preselected transverse position.

8. The invention as set forth in claim 7 wherein the upright flange is apertured and the means for securing includes a spring-loaded pin connected to the hanger structure and biased toward the aperture.

9. Unit support structure for mounting a row unit for transverse movement on the forward end of an agricultural harvester, comprising:

a transversely extending row unit support frame including a horizontal support rail;

a roller connected to the row unit and supporting the row unit for transverse movement along the support rail;

selectively engageable locking means located between the row unit and the unit support frame for releasably securing the row unit against movement relative to the unit support frame; and means operably connected to the roller for turning the roller to drive the row unit along the support rail when the locking means is released, thereby facilitating transverse adjustment of the row unit.

10. The invention as set forth in claim 9 wherein the roller is generally V-shaped and the support rail projects into the roller to prevent fore-and-aft movement of the row unit relative to the support rail.

11. The invention as set forth in claim 9 wherein the locking means includes a biased pin for automatically securing the row unit against movement at preselected transversely spaced locations along the support rail thereby preventing the row unit from rolling beyond the preselected locations.

12. The invention as set forth in claim 11 wherein the locking means is located adjacent the roller, and the means for turning the roller includes a shaft connected to and projecting from the roller.

13. The invention as set forth in claim 12 wherein the shaft includes means for receiving a wrench thereon.

14. The invention as set forth in claim 10 wherein the support rail comprises a transversely extending angle and an elongated rod connected to the angle and supporting the roller thereon.

15. The invention as set forth in claim 14 including hanger means connected to the row unit and to the roller for supporting the row unit from the rod.

16. The invention as set forth in claim 15 wherein the hanger means includes means for preventing contact between the row unit and the support rail.

17. The invention as set forth in claim 15 wherein the locking means comprises pin means connected to the hanger means and wherein the angle is apertured at preselected transversely spaced locations for receiving the pin means.

* * * * *